United States Patent [19]
Chew

[11] Patent Number: 5,692,173
[45] Date of Patent: Nov. 25, 1997

[54] METHOD AND SYSTEM FOR COMBINING PREFIX AND FIRST CHARACTER SEARCHING OF A LIST

[75] Inventor: Chee Heng Chew, Redmond, Wash.

[73] Assignee: Microsoft Corporation, Redmond, Wash.

[21] Appl. No.: 354,913

[22] Filed: Dec. 13, 1994

[51] Int. Cl.⁶ .................................................. G06C 17/30
[52] U.S. Cl. .......................... 395/603; 395/605; 395/604; 395/607; 395/796; 395/764
[58] Field of Search ........................... 395/600, 148, 395/603, 604, 605, 607, 796, 764; 364/300, 419

[56] References Cited

U.S. PATENT DOCUMENTS

| | | | |
|---|---|---|---|
| 4,453,217 | 6/1984 | Boivie | 364/300 |
| 4,969,097 | 11/1990 | Levin | 364/419 |
| 5,222,234 | 6/1993 | Wang et al. | 395/600 |
| 5,312,478 | 5/1994 | Reed et al. | 395/148 |

OTHER PUBLICATIONS

Cox, Joyce et al., "A Quick Course In Windows For Workgroups," *Online Press Book*, 1992, Chapter 2, Learning Windows, pp. 18-23, Chapter 5, Communicating with Colleagues, pp. 106-112.

*Primary Examiner*—Thomas G. Black
*Assistant Examiner*—C. Lewis
*Attorney, Agent, or Firm*—Seed and Berry LLP

[57] ABSTRACT

A method and system for combining prefix and first character search methods. The present invention provides a combined search method for searching for elements in a list. The combined search method maintains a user input buffer that contains a plurality of search characters. The combined search method searches for a particular list element in a list, where each list element is a sequence of characters. That is, the combined search method searches for a list element whose prefix matches the search characters in the user input buffer. If each of the search characters in the user input buffer is the same, the combined search method also searches for a list element whose first character matches a search character in the user input buffer. If one list element is found, the combined search method selects that list element. If two list elements are found, the combined search method selects one of the two list elements based on its proximity to a predetermined list element.

31 Claims, 7 Drawing Sheets

METHOD AND SYSTEM FOR COMBINING PREFIX AND FIRST CHARACTER SEARCHING OF A LIST

TECHNICAL FIELD

This invention relates generally to a method for searching a list on a computer device, and more specifically, to a method for combining prefix and first character search techniques.

BACKGROUND OF THE INVENTION

Computer systems often use lists to organize elements, such as file names or folder names. The ability to search a list quickly and to find a desired list element is advantageous. In addition, the ease of use of a particular search method particularly appeals to users. Different computer systems offer different methods of searching lists. Generally, some computer systems offer the prefix search method (also known as the incremental search method) and others offer the first character search method. Both search methods typically start by displaying a portion of the list on a display device in a scrollable list box.

Sometimes, the list is too large to display in its entirety on a display device. Therefore, only a portion of the list may be displayed. For example, a list box containing font types, such as "Times New Roman" and "Courier", for a word processing program may only display ten font types even though the list contains twenty font types. Similarly, a list box containing a list of files on the computer system may only display twelve files although the list may contain a hundred files. Because lists may be too large to display in their entirety, a list searching method is useful.

The prefix search method allows a user to enter the prefix of a list element to be found in a list. As the user enters each character in the prefix, the prefix search method searches the list for the first list element whose prefix matches the characters entered so far. When a list element is found, the prefix search method selects the list element. The prefix search method then scrolls the list box as appropriate and highlights the selected list element. For example, if the user enters the character "H", then the prefix search method searches for the first list element starting with the character "H". If the user then enters the character "O", the prefix search method searches for the first list element starting with the prefix "HO". One of the difficulties of using the prefix search method is that the user typically needs to know the exact prefix of the list element to be found. For example, if the user desires to find list element "HOLMES", which is phonetically pronounced "HOMES", and the user enters the prefix "HOM", then the prefix search method finds, selects and highlights list element "HOMES". Also, if list element "HOLMES" is not before list element "HOMES" (the list is not necessarily in alphabetic order), then the prefix search method would not find the desired list element even when the user enters the prefix "HO". The first character search method, discussed below, may be preferable in this instance because it would allow the user to sequentially search through the list, starting with the first list element whose first character is the character "H".

The first character search method is similar to the prefix search method in that when a single character is entered, the first character search method searches for the first list element that begins with that character. For example, if the user only entered the character "H", then the first character search method searches for the first list element starting with the character "H". The methods, however, differ in what they search for when the next character is entered. When the second character entered is the same as the previous character entered (e.g., "HH"), the first character search method searches for the second list element that begins with the entered character, and so on as long as the user continues entering the same character. In this way, a user can sequentially search through a list in order to find each list element that begins with a certain character. When a list element is found, the first character search method selects the list element. Like the prefix search method, the first character search method scrolls the list box as appropriate and highlights the selected list element. For instance, if the user enters the character "H", the first character search method searches for the first list element starting with the character "H". When the user enters another character "H", the first character search method then searches for the second list element starting with the character "H" and so on. If the user next enters the character "B", then the first character search method begins a new search and searches for the first list element starting with the character "B". One of the difficulties of using the first character search method occurs when the list has many list elements starting with the character the user enters and the desired list element is far down the list. The user can only find the desired list element by continuously re-entering the starting character. Finding the desired list element is especially difficult when the list is not alphabetically ordered. If the user knew the exact prefix of the list element desired, then a prefix search method would be preferable in this case.

In addition to the difficulties discussed above, computer systems implementing either search method often do not give user feedback when a list element is not found, except that the last list element found remains selected and highlighted. Although some computer systems do give user feedback by "beeping" when a list element is not found, these computer systems may continue to beep when additional characters are entered unless a new search is started.

SUMMARY OF THE INVENTION

It is an object of the present invention to provide an improved search method which allows for both prefix search and first character search methods.

It is another object of the present invention to provide a method and system for effectively providing user feedback if the search fails to find a match.

These and other objects, which will become apparent as the invention is more fully described below, are obtained by a method of combining prefix search and first character search methods. In a preferred embodiment, the present invention provides a combined search method for searching for elements in a list. The combined search method maintains a user input buffer that contains a plurality of search characters. The combined search method searches for a particular list element in a list, where each list element is a sequence of characters. That is, the combined search method searches for a list element whose prefix matches the search characters in the user input buffer. If each of the search characters in the user input buffer is the same, the combined search method also searches for a list element whose first character matches a search character in the user input buffer. If only one list element is found that matches, the combined search method selects that list element. If two list elements are found, the combined search method selects a final list element from one of the two list elements based on its proximity to a predetermined list element.

DETAILED DESCRIPTION OF THE INVENTION

The present invention is directed to a method and system of combining prefix search and first character search methods in order to provide the benefits each method offers while avoiding the difficulties encountered when only one search method is available. The combined search method of a preferred embodiment performs a prefix search, and when a user enters the same character at least twice and without entering any different characters during the current search, the combined search method also performs a first character search. The combined search method performs only a prefix search when a single character is entered, and when more than one character is entered and each of the characters is not the same. If a list element is found by the prefix search method, then the combined search method selects and highlights that list element. When, however, more than one character is entered and each character is the same, the combined search method performs both a prefix search and a first character search. For example, the combined search method performs both a prefix search and a first character search when a user enters the characters "HH", but only performs a prefix search when a user enters the characters "HOHH". After the searches have been performed, if both searches found list elements, then the combined search method selects one of the found list elements based on its proximity to the search starting point and highlights that list element. In a preferred embodiment, the combined search method selects one of the found list elements based on its alphabetic proximity to the search starting point. On the other hand, if only the prefix search method found a list element or only the first character search method found a list element, then the combined search method selects and highlights that list element.

Figure 1:
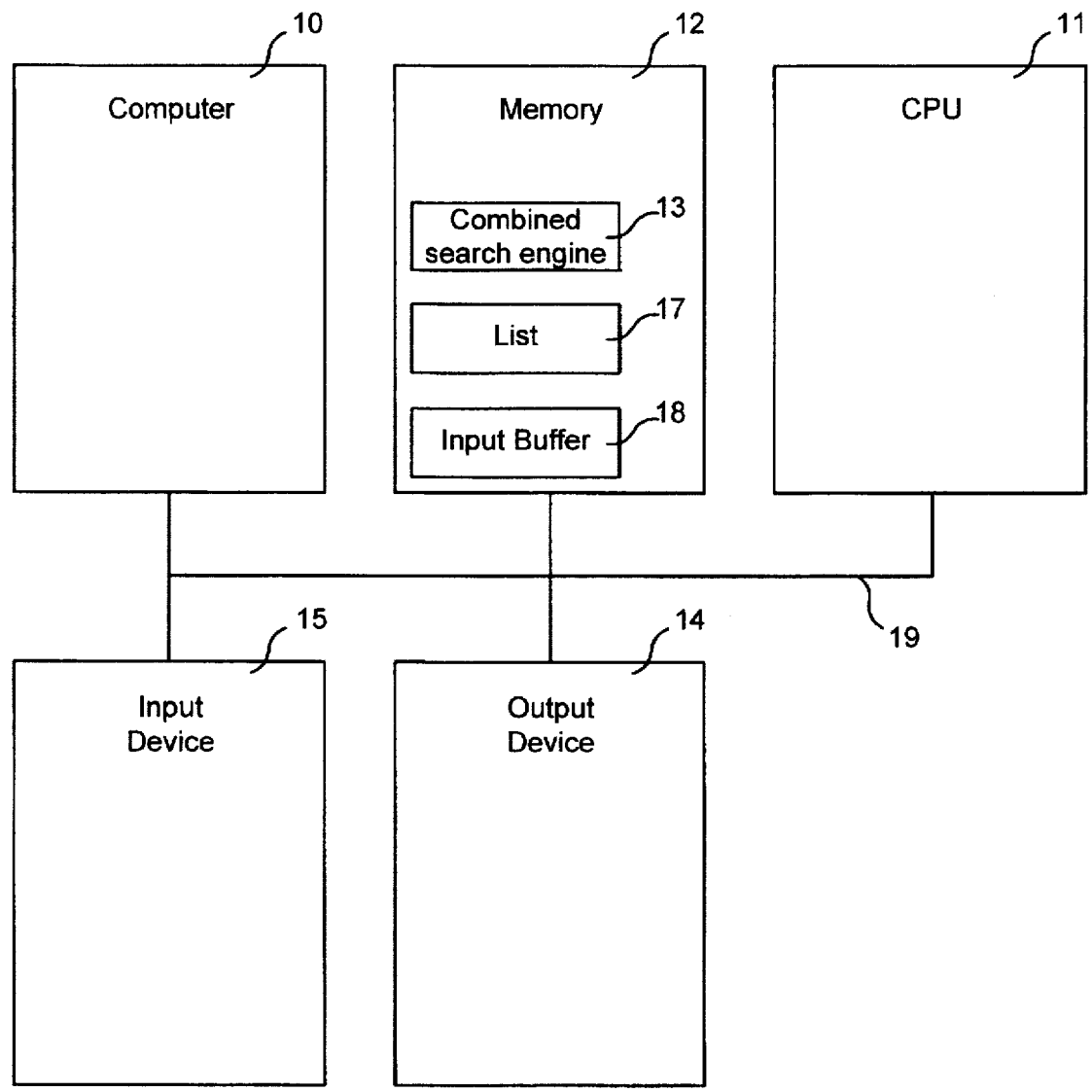
FIG. 1 shows an overview block diagram of the combined search method practiced in a preferred embodiment.

FIG. 1 shows an overview block diagram of an apparatus for combined list searching in a preferred embodiment of the present invention. The computer system 10 has a CPU 11 and a memory 12. The memory includes a combined search engine 13, a list to be searched 17, and an input buffer 18. The computer system also has an output device 14, such as a display screen, and an input device 15, such as a mouse and keyboard. The CPU executes the combined search engine at the request of a user which is received through an input device. The combined search engine searches the list based on user input, which is received through an input device. If the user input is a search character, it is added to the input buffer. The combined search engine presents the selected list element through an output device. Furthermore, a program, rather than a user, may initiate execution of the combined search engine.

The combined search method displays the list to be searched on the computer display, using, for example, a scrollable list box. In addition, when a list is first chosen and displayed, the combined search method designates one of the list elements to be the focus. Typically, the combined search method designates the first list element as the focus by default. The user, however, may initially designate a different list element to be the focus. The user may do this by pointing at a different list element using a pointing device, such as a mouse, or by entering "arrow" characters from a user input device, such as a keyboard. In a preferred embodiment, the list element with the focus is also the search starting point. Before starting a search, the combined search method designates the list element with the focus to be the search starting point. When the focus is changed, the combined search method changes the search starting point to be the list element with the focus. Upon receiving a search a character, the combined search method begins a search at the search starting point.

The preferred embodiment may be better understood through the following examples. FIGS. 2–9 show example lists for the combined search method practiced in a preferred embodiment. FIGS. 2–9 show screen displays of a list consisting of file names, as list elements 21–27. The ellipses indicate that the list contains additional list elements which are not displayed. In a preferred embodiment of the present invention, a user may only see a portion of the list, as shown in FIGS. 2–9, on an output device, such as a display screen. In the alternative, the entire list may be displayed.

Figure 2:
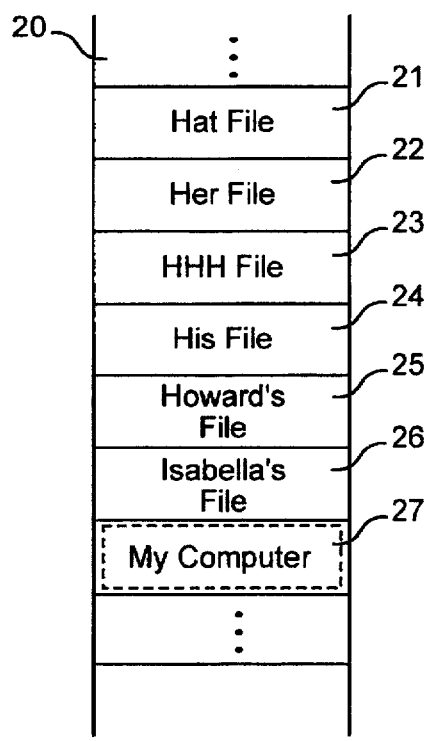
FIGS. 2–9 show example lists for the combined search method practiced in a preferred embodiment.
Figure 3:
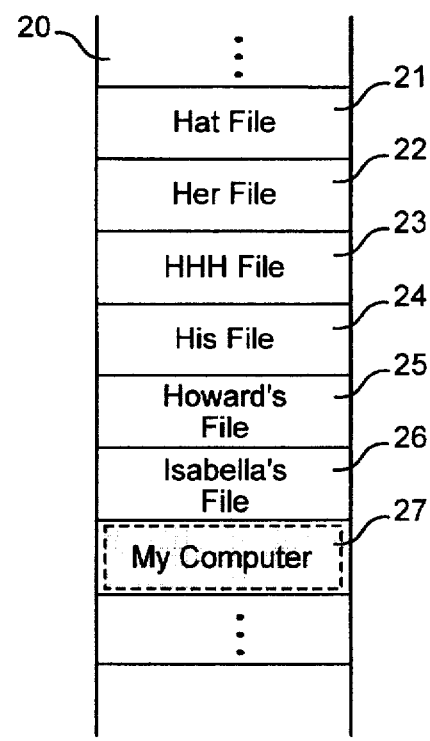
Figure 4:
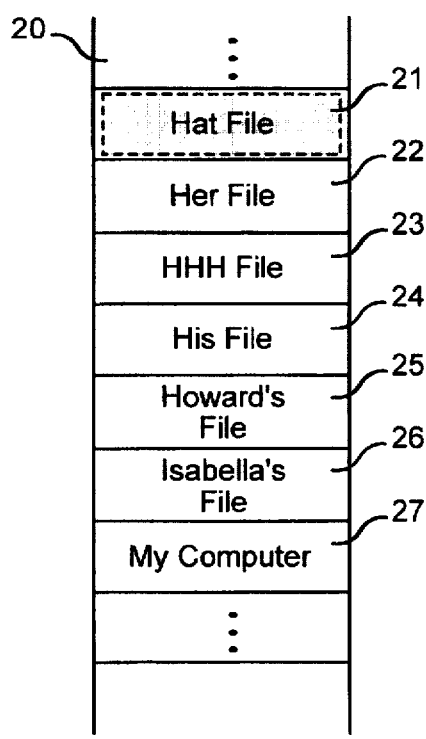
Figure 5:
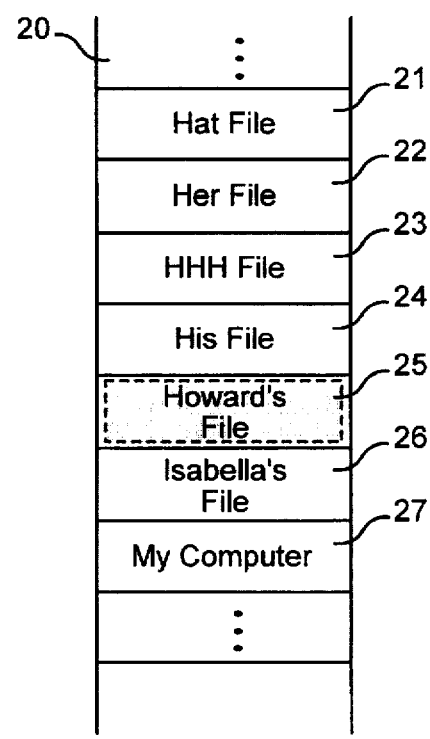

In FIG. 2, list element "My Computer" 27 is currently the focus, as indicated by the dotted box around list element "My Computer", and so the combined search method sets the search starting point to list element "My Computer". If the first character a user enters is a space character (" "), then the combined search method selects and highlights the list element with the focus, for example, list element "My Computer" 27 of FIG. 3. A user would enter a space character (" ") as the first character in order to select and highlight the list element with the focus. If the user then enters the character "H", the combined search method performs a prefix search and searches for a list element whose first character is "H" from the search starting point to the end of the list and wrapping to the beginning of the list as appropriate. The combined search method finds, selects, and highlights list element "Hat File" 21 of FIG. 4, moves the focus to list element "Hat File", and sets the search starting point to list element "Hat File". If the user then enters the character "O", the combined search method performs a prefix search for a list element whose prefix matches the characters "HO". The combined search method again starts the search at the current search starting point, which is list element "Hat File". In this example, the combined search method finds, selects, and highlights list element "Howard's File" 25 of FIG. 5.

The following examples illustrate the combined search method when more than one search character has been entered and each of the search characters is the same. In this case, the combined search method performs both a prefix search and a first character search. When each search finds a list element, the combined search method selects and highlights the list element found which is the list element closer to and following the search starting point. In a preferred embodiment, the combined search method searches forward through the list, wrapping around as appropriate.

A user may start a new search by changing the focus. The user may change the focus by pointing at a different list element using a pointing device, such as a mouse, or by entering "arrow" characters from a user input device, such as a keyboard. For example, in FIG. 6, the user has set the focus on list element "Her File" 22. When the focus is changed, the combined search method sets the search starting point to the list element with focus and starts a new search upon receiving a search character.

Figure 6:
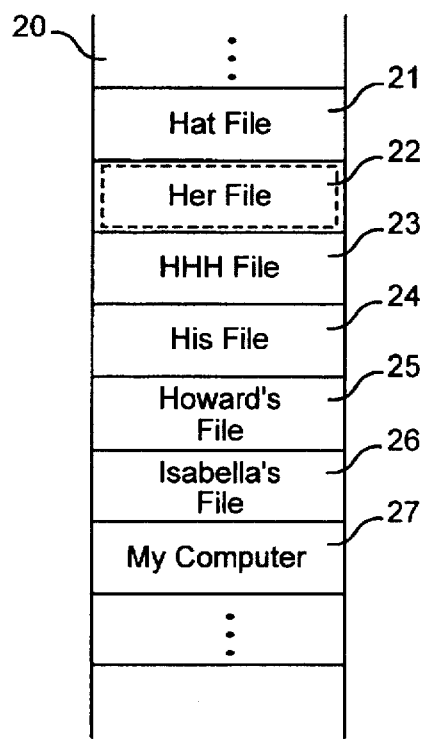
Figure 7:
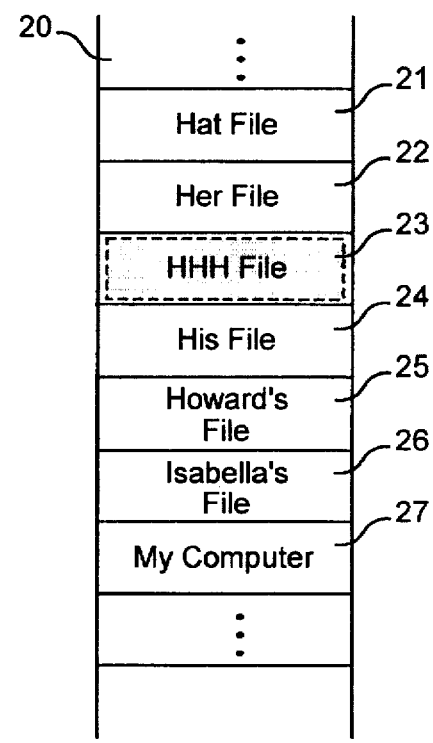
Figure 8:
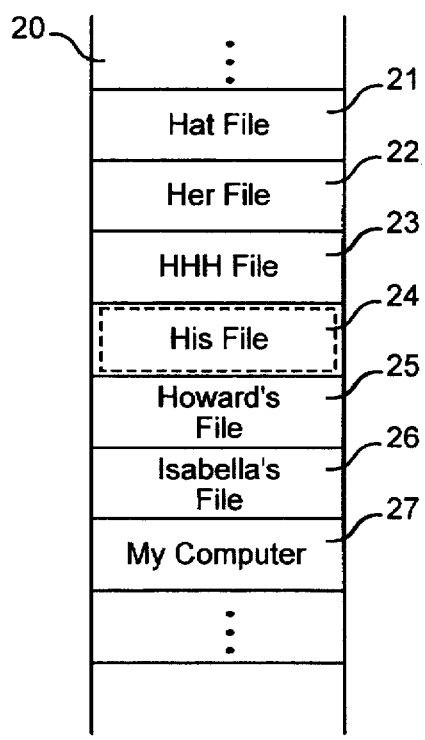
Figure 9:
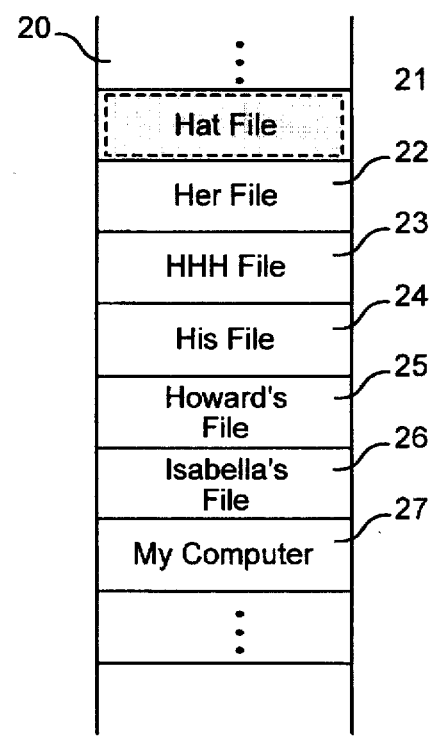

Continuing with the example, in FIG. 6, when a user enters the characters "HH", the combined search method selects and highlights list element "HHH File" 23 of FIG. 7. In this example, the combined search method performs a prefix search which finds list element "HHH File" and performs a first character search which finds list element "His File." The combined search method selects and highlights list element "HHH File" 23 of FIG. 7 because it is the list element closest to the search starting point, which is list element "Her File". In a related example, in FIG. 8, the user has changed the focus, thereby setting the search starting point to the list element "His File" 24. When the user enters the characters "HH", the combined search method selects and highlights list element "Hat File" 21 of FIG. 9. Here, the combined search method performs a prefix search which finds list element "HHH File" and performs the first character search which finds list element "Hat File". Since list element "Hat File" 21 of FIG. 9 is closer to the search starting point, which is list element "His File", the combined search method selects and highlights it.

Figure 10:
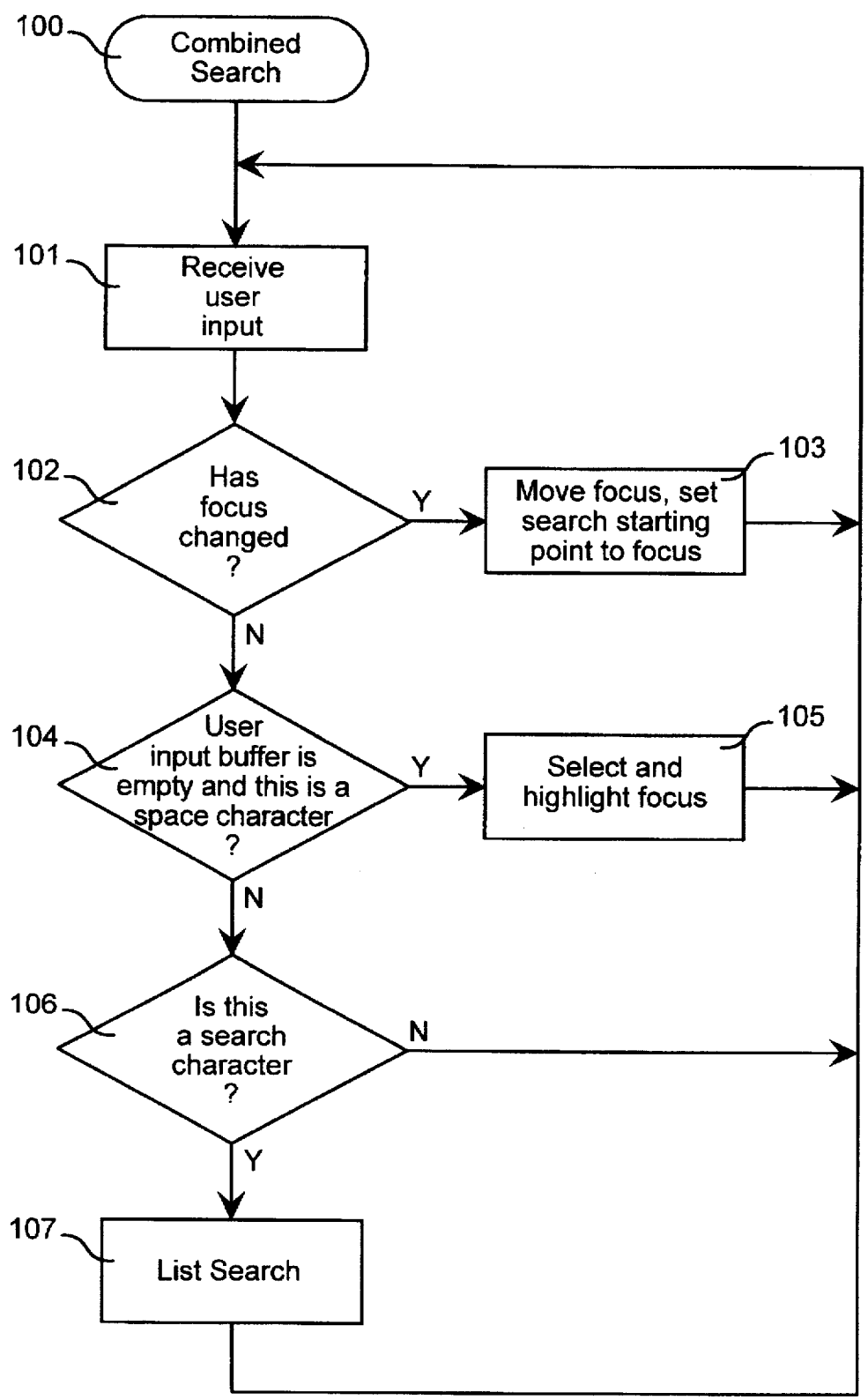
FIG. 10 shows an overview flow diagram of the combined search method.

FIG. 10 shows an overview flow diagram of the combined search method. The combined search method receives user input that may include focus change input, a space character, a search character, or other input such as a character or mouse movement. When the combined search method receives a focus change input, it resets the search starting point to be the list element with the focus. The user may designate a different list element to be with the focus by entering focus change input. In a preferred embodiment, focus change input is either input received from a pointing device, such as a mouse, which points at a different list element or input of "arrow" characters received from a user input device, such as a keyboard. When the first character the combined search method receives is a space character, it selects and highlights the list element with the focus. When the combined search method receives a search character, it performs the list search routine as described below. When the combined search method receives other input, it ignores this other input.

More specifically, in step 101, the combined search program receives user input. In step 102, if the user input is focus change input, the combined search method continues at step 103, else the combined search method continues at step 104. The focus change input may be either an "arrow" character entered from a keyboard or a mouse indication to choose a different list element. In step 103, the combined search method moves the focus and sets the search starting point to be the list element with the focus and loops to step 101 to receive user input. In step 104, if the user input buffer contains no search characters and the user input is a space character (""), then the combined search method continues at step 105, else the combined search method continues at step 106. In step 105, the combined search method selects and highlights the list element with the focus and loops to step 101 to receive user input. In step 106, if the user input is a search character, then the combined search method continues at step 107, else the combined search method loops to step 101 to receive user input. In step 107, the combined search method performs the list search routine and loops to step 101 to receive user input. When the combined search method finds a list element, it sets the focus to the list element, selects the list element, highlights the list element, and sets the search starting point to be the list element with the focus.

Figure 11:
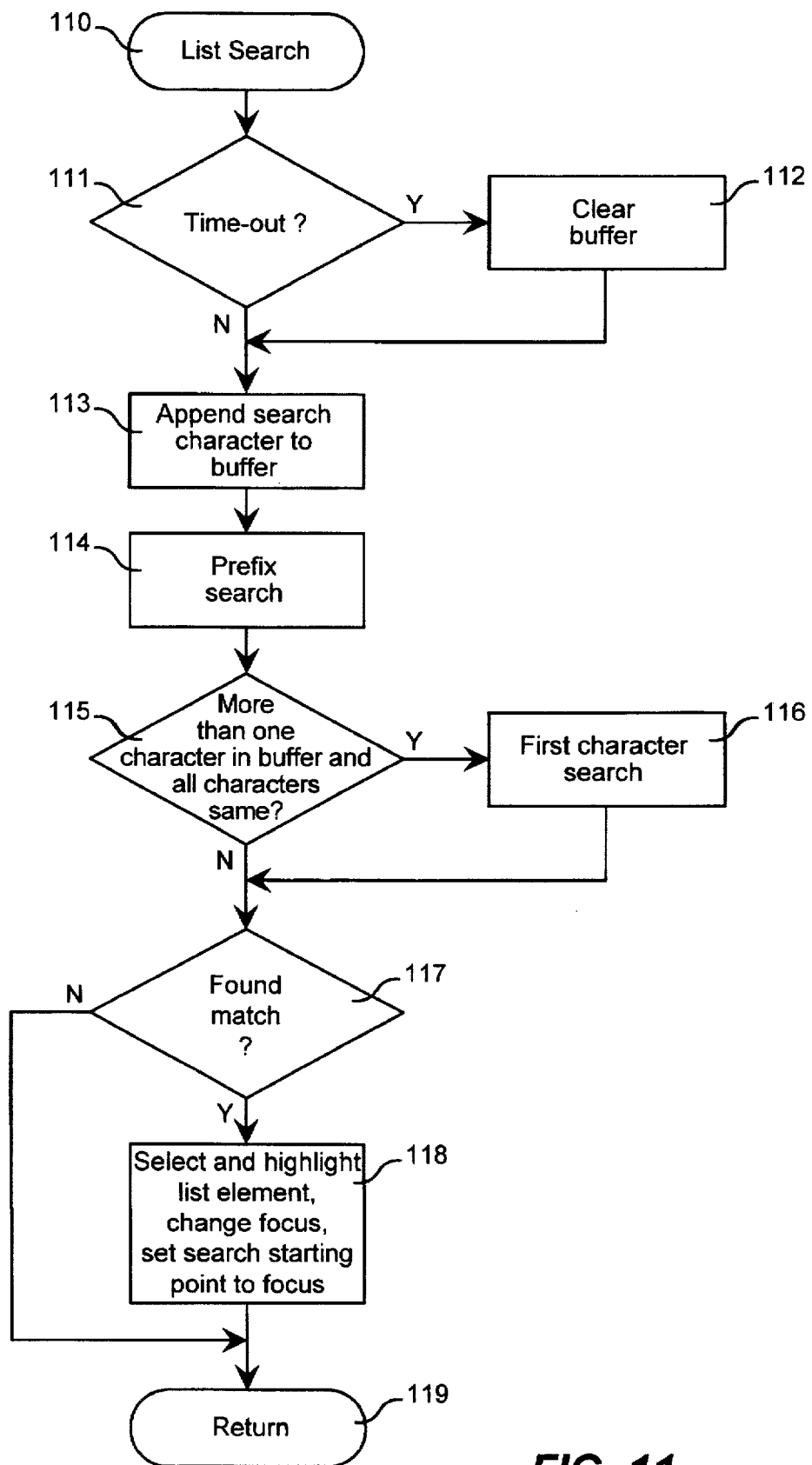
FIG. 11 shows a detailed flow diagram of the list search routine.

FIG. 11 shows a detailed flow diagram of the list search routine. The list search routine determines whether to perform only the prefix search or also perform the first character search, performs the search(es), and selects and highlights a list element. The list search routine first determines if a time-out has occurred. A time-out is a predetermined lapse of time during which no user input is received. In the preferred embodiment, the predetermined lapse of time is one second. A time-out indicates that the user has stopped entering characters for the current search and the list search routine assumes that the next characters entered are for a new search. That is, the list search routine uses a timeout to determine when to end the current search and start a new search. If a time-out has not occurred, then the list search routine appends the search character to the user input buffer. If a time-out has occurred, then the list search routine first clears the user input buffer and then appends the search character to the user input buffer.

The list search routine then performs a prefix search, but it performs a first character search only when the user input buffer contains more than one character and each of the characters is the same. After performing either just the prefix search or both the prefix and first character searches, the list search routine determines if a list element was found. In a prefix search, a list element is found when its prefix matches the search characters in the user input buffer. In a first character search, a list element is found when its first character is the same as a search character in the user input buffer. After performing the searches, the list search routine selects and highlights a found list element. That is, when only the prefix search is performed and a list element is found, the list search routine selects and highlights this list element. When both the prefix and first character searches are performed, and only one search found a list element, the list search routine selects and highlights this list element. When both the prefix and first character searches are performed, and each search finds a list element, the list search routine selects the list element found based on its alphabetic proximity to the search starting point and highlights this list element. On the other hand, if neither the prefix nor the first character search found a list element, the combined search method outputs feedback to indicate that no list element was found for the current search. In a preferred embodiment, the combined search method outputs audio feedback, such as by "beeping."

In step 111 of FIG. 11, if a time-out has occurred, the list search routine continues at step 112, else the list search routine continues at step 113. In step 112, the list search routine clears the user input buffer and continues at step 113. In step 113, the list search routine appends the search character to the user input buffer and continues at step 114. In step 114, the list search routine performs the prefix search routine and continues to step 115. In step 115, if the user input buffer contains more than one character and each of the characters is the same, then the list search routine continues at step 116, else the list search routine continues at step 117. In step 116, the list search routine performs a first character search and continues at step 117. In step 117, if either the prefix search or first character search found a list element, then the list search routine continues at step 118, else the list search routine outputs feedback to indicate no list element was found and returns. In step 118, the list search routine selects a list element, highlights the selected list element, moves the focus to the selected list element, sets the search starting point to the list element with the focus, and returns.

Figure 12:
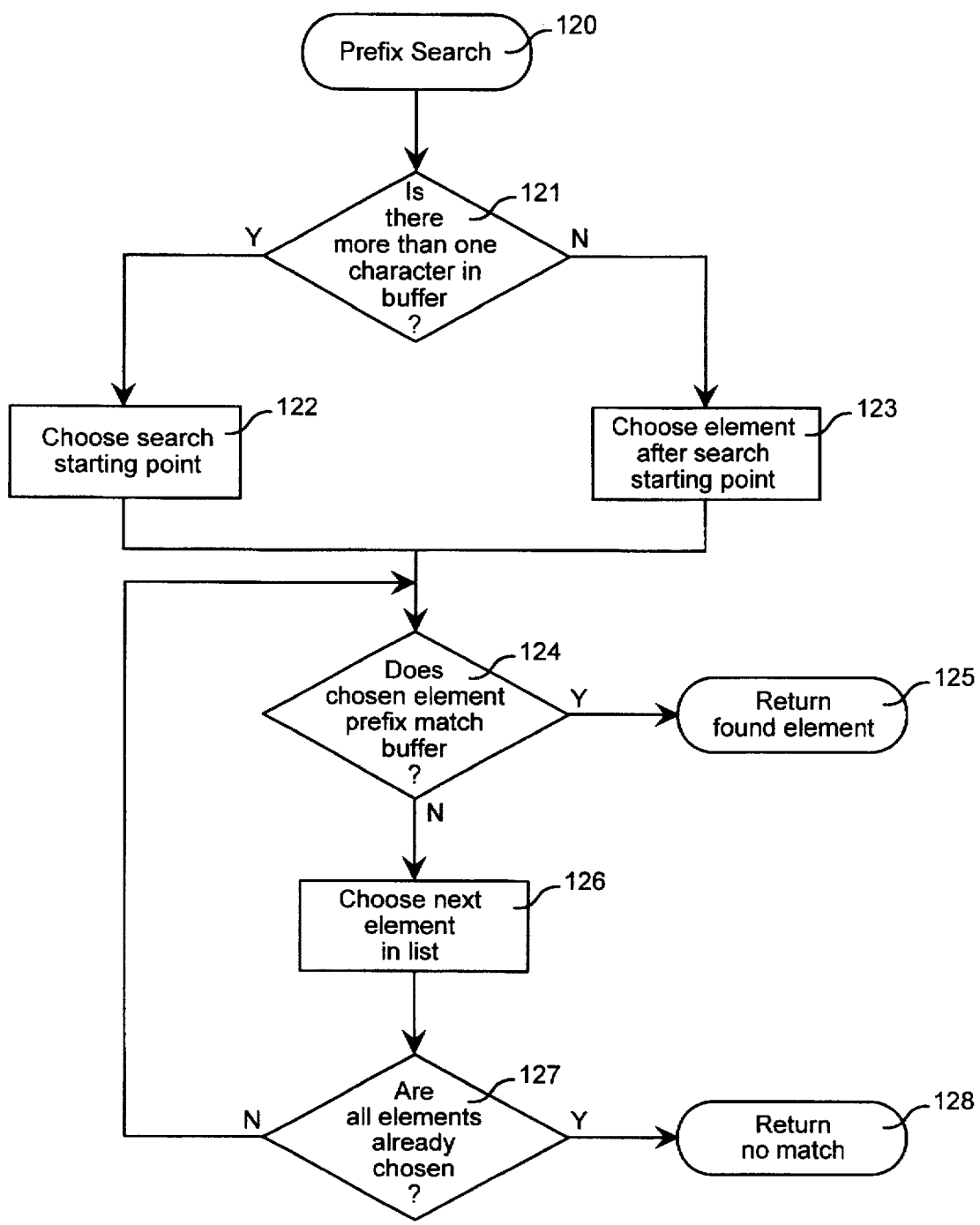
FIG. 12 shows a detailed flow diagram of the prefix search routine.

FIG. 12 shows a detailed flow diagram of the prefix search routine. The prefix search routine searches for the next list element whose prefix is the same as the search character sequence. The search character sequence may be one or more characters, and it is the sequence of characters which the user enters, and is stored in the user input buffer. That is, the prefix search routine compares the prefix of each list element with the search character sequence until a list element is found or it is determined that no list elements have a prefix that is the same as the search character sequence. If the user input buffer contains only one character, then a new search has just begun, and the combined search method assumes the user does not intend to find the list element which is the search starting point. Therefore, when the user input buffer contains only one character, the prefix search routine will start its comparison by first choosing the list element after the search starting point. Otherwise, when the user input buffer contains more than one character, the prefix search routine chooses the list element designated as the search starting point to begin its comparison. After choosing a list element, the prefix search routine determines if the list element's prefix is the same as the search character sequence, and if so, returns the found list element. Otherwise, the prefix search routine chooses the next list element and determines if all list elements have already been chosen. If all list elements have already been chosen, then the prefix search routine has already compared each list element's prefix with the search character sequence and has not found a list element whose prefix is the same as the search character sequence. Therefore, if all list elements have already been chosen, the prefix search routine returns an indication that a list element was not found.

In step 121, if the user input buffer contains more than one character, the prefix search routine continues at step 122, else the prefix search routine continues at step 123. In step 122, if the user input buffer contains more than one character, the prefix search routine chooses the list element after the search starting point. In step 123, if the user input buffer contains only one character, the prefix search routine chooses the list element designated as the search starting point. In step 124, if the chosen list element's prefix is the same as the search character sequence, then the prefix search routine continues at step 125, else the prefix search routine continues at step 126. In step 125, the prefix search routine returns the found list element. In step 126, the prefix search routine chooses the next list element. In step 127, if all list elements have already been chosen, the prefix search routine continues at step 128, else the prefix search routine loops to step 124 to compare the chosen list element's prefix with the search character sequence. In step 128, the prefix search routine returns an indication that a list element was not found.

Figure 13:
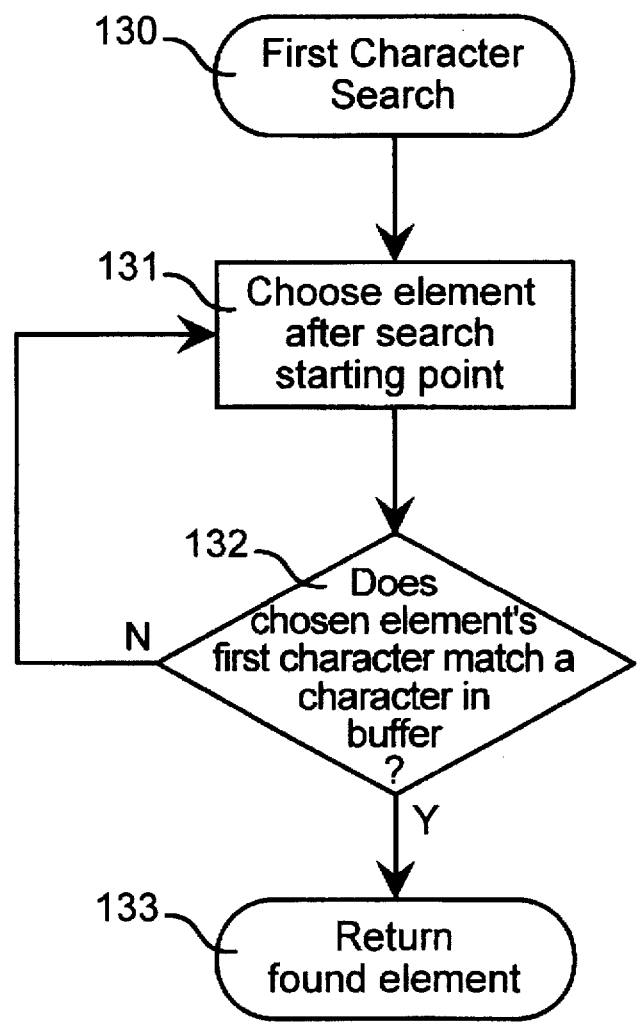
FIG. 13 shows a detailed flow diagram of the first character search routine.

FIG. 13 shows a detailed flow diagram of the first character search routine. The first character search routine is invoked only when the user input buffer contains more than one search character, and each search character is the same. If the user input buffer contains only one search character, the first character search routine is not invoked. Instead, the prefix search routine is invoked. Then, if the prefix search routine finds a list element with a first character which is the same as the first search character, and at least one more search character is entered which is the same as the first search character, the first character search routine is invoked. The first character search routine searches for the next list element whose first character is the same as a search character in the user input buffer. That is, the first character search routine compares the first character of each list element with a search character in the user input buffer until a list element is found whose first character is the same as a search character. The combined search method assumes the user does not intend to find the list element which is the search starting point. Therefore, the first character search routine will start its comparison by first choosing the list element after the search starting point. Then the first character search routine determines if the first character of the chosen list element is the same as a search character, and if so, returns the found list element. Otherwise, the first character search routine chooses the next element in the list. Since the first character search routine is only invoked after the prefix search routine has already found a list element that starts with a search character, the first character search routine will find at least one list element whose first character is the same as a search character on the user input buffer. If only one list element starts with a search character, the first character search routine will loop through the list and stop searching at that one list element. The first character search routine then returns this found list element. In step 131, the first character search routine chooses the list element after the search starting point and continues to step 132. In step 132, if the chosen list element's first character is the same as a search character, then the first character search routine continues at step 133, else the first character search routine loops to step 13 1 to choose the next list element. In step 133, the first character search routine returns the found list element.

Although the present invention has been described in terms of the preferred embodiment, it is not intended that the invention be limited to this embodiment. Modification within the spirit of the invention will be apparent to those skilled in the art. For example, the present invention can be used to search data structures other than lists. In particular, the data to be searched may be organized in a hierarchical manner. The scope of the present invention is defined by the claims which follow.

I claim:

1. A method in a computer system for selecting a list element in a list, each list element having a sequence of characters and having a position in the list, the computer system having a user input buffer containing a plurality of search characters, the method comprising the steps of:

searching for a list element with a prefix that matches the search characters;

determining whether each of the search characters is the same character;

when it is determined that each of the search characters is the same character, searching for a list element whose first character matches a search character;

when the searching finds only one list element that matches, selecting that list element; and when the searching finds two distinct list elements, wherein one list element has a prefix that matches the search characters and the other list element has a first character that matches a search character, selecting from the two list elements a final list element based on its position relative to the position of a predetermined list element.

2. The method of claim 1 wherein the step of searching for a list element with a prefix that matches the search characters includes starting the searching from a search starting point that is at the position of a previously selected list element.

3. The method of claim 1 wherein the step of searching for a list element whose first character matches a search character includes starting the searching after a search starting point that is at the position of a previously selected list element.

4. The method of claim 1 wherein the step of selecting a final list element based on its position relative to the position of a predetermined list element selects the list element whose position is closest to a search starting point.

5. The method of claim 1 including the step of designating the position of the selected list element to be a search starting point.

6. The method of claim 1 including the step of outputting a feedback to indicate that the searching did not find a list element.

7. A method in a computer system for searching a list containing list elements, each list element having a sequence of characters and a position in the list, the method comprising the steps of:

receiving a plurality of search characters;

performing a prefix search of the list to find a list element whose prefix matches the received search characters;

determining whether each of the search characters is the same character;

when it is determined that each of the search characters is the same character, performing a first character search of the list to find a list element whose first character matches a search character;

when only one list element is found, selecting that found list element; and when two different list elements are found, selecting one of the found list elements based on its position relative to the position of a predetermined list element.

8. The method of claim 7 wherein the step of performing a prefix search includes starting the prefix search from a search starting point that is the position of a previously selected list element, and wherein the step of selecting one list element based on its position relative to the position of a predetermined list element selects the list element whose position is closest to the search starting point.

9. The method of claim 7 wherein the step of performing a first character search includes the step of starting the first character search after a search starting point that is at the position of a previously selected list element, and wherein the step of selecting one list element based on its position relative to the position of a predetermined list element selects the list element whose position is closest to the search starting point.

10. The method of claim 7 including the step of outputting a feedback to indicate that neither the prefix search nor the first character search found a list element.

11. A method in a computer system for searching a list, the computer system having a user input device and a user input buffer for holding search characters, the list containing list elements, each list element having a position in the list, the method comprising repeating the following steps:

receiving user input from the user input device until a search character is received;

adding the search character to the user input buffer;

comparing the search characters in the user input buffer with the prefix of each list element until either finding a prefix search list element whose prefix is the same as the search characters in the user input buffer or detecting that no list element has a prefix which is the same as the search characters in the user input buffer;

determining whether the user input buffer contains more than one search character;

when it is determined that the user input buffer contains more than one search character, determining whether each of the search characters in the input buffer is the same;

when it is determined that each of the search characters in the user input buffer is the same, comparing a search character in the user input buffer with the first character of each list element until finding a first character search list element whose first character is the same as a search character in the user input buffer or detecting that no list element has a first character that is the same as a search character in the user input buffer;

when both a prefix search list element and a first character search list element are found, selecting one of the found list elements based on its position relative to the position of a predetermined list element; and when only a prefix search list element or only a first character search list element is found, selecting the found list element.

12. The method of claim 11 wherein the method comprises repeating the steps until a new search is indicated by a predetermined lapse of time during which no user input is received.

13. The method of claim 11 including the step of having a list element designated as a list element with focus and receiving user input from the user input device designating a different list element to be with focus and designating that different list element to be with focus.

14. The method of claim 13 including the step of receiving user input from the user input device for a space character ("") when the user input buffer contains no search characters and selecting and highlighting the list element with focus.

15. The method of claim 13 including the step of, after designating a different list element to be with focus, setting a search starting point to be the list element with focus.

16. The method of claim 11 including the step of comparing the search characters in the user input buffer with the prefix of each list element starting with a predetermined search starting point when the user input buffer contains more than one search character and starting with a list element after the predetermined search starting point when the user input buffer contains only one search character.

17. The method of claim 11 including the step of comparing a search character in the user input buffer with the first character of each list element starting with the list element after a predetermined search starting point.

18. The method of claim 11 including the step of outputting a feedback to indicate that neither a prefix search list element nor a first character search list element was identified.

19. A method in a computer system for detecting whether to execute a prefix search or a first character search, the computer system having a list containing list elements with one list element designated as a search starting point, the method comprising the steps of:

determining whether a prefix search would find a list element and a first character search would find a different list element;

when the prefix search and first character search would find different list elements, determining whether the prefix search or the first character search would find a list element closer to the search starting point;

when the prefix search would find a list element closer to the search starting point, performing the prefix search; and when the first character search would find a list element closer to the search starting point, performing the first character search.

20. A computer system with an input device, an output device, a list containing list elements, an input buffer, and a combined search engine, the system comprising:

means for receiving a plurality of search characters from the input device;

means for storing the received search characters in the input buffer;

means for performing a prefix search based on the search characters in the input buffer using the combined search engine;

means for determining whether each of the search characters in the input buffer is the same;

means for performing a first character search when it is determined that each of the search characters in the input buffer is the same;

means for selecting a found list element when at least the prefix search or the first character search finds a list element; and means for displaying the selected list element on the output device.

21. The system of claim 20, further comprising means for outputting a feedback to indicate the searching did not find a list element.

22. A method in a computer system for selecting a list element in a list, each list element having a sequence of characters and a position in the list, the computer system having a plurality of search characters and a combined search system for performing searches, the method comprising:

performing a prefix search of the list using the combined search system to find a list element with a prefix that matches the search characters starting from a predetermined position in the list;

determining whether each of the search characters is the same;

when it is determined that each of the search characters is not the same and the prefix search found a match, selecting the result of the prefix search; and when it is determined that each of the search characters is the same, performing a first character search of the list using the combined search system to find a list element whose first character matches a search character starting from the position following the predetermined position in the list;

when only the first character search found a list element, selecting the found list element;

when the prefix search and the first character search both found the same list element, selecting that list element; and when the prefix search and the first character search each found a different list element, selecting the result of whichever search found a list element whose position is closer to the predetermined position in the list.

23. The method of claim 22, further comprising outputting a feedback to indicate the searching did not find a list element.

24. The method of claim 22, further comprising designating the selected list element to be a search starting point.

25. A method in a computer system for selecting a list element in a list, each list element having a sequence of characters and having a position in the list, the computer system having a user input buffer containing a plurality of search characters, the method comprising:

searching for a list element with a prefix that matches the search characters in the user input buffer;

determining whether each of the search characters is the same character;

when it is determined that each of the search characters is the same character, searching for a list element whose first character matches a search character;

when the searching finds either a list element with a prefix that matches the search characters or a list element with a first character that matches a search character, selecting the found list element; and when the searching finds a list element with a prefix that matches the search characters and a different list element with a first character that matches a search character, then selecting one of these found list elements based on its position relative to the position of a predetermined list element in the list.

26. The method of claim 25, further comprising outputting a feedback to indicate the searching did not find a list element.

27. A computer-readable storage medium containing computer instructions that cause a computer system to:

receive a plurality of search characters;

perform a prefix search of a list to find a list element starting at a search starting point, the list containing list elements, each list element having a sequence of characters and a position in the list;

determine whether each of the search characters is the same;

when it is determined that each of the search characters is the same, perform a first character search of the list to find a list element starting at the position of the list element following the search starting point;

when only one list element is found, select the found list element; and when two list elements are found, select one of the found list elements based on its position proximate to the search starting point.

28. The computer-readable storage medium of claim 27 wherein the computer instructions cause the computer to output a feedback indicating that no list element was found.

29. A computer-storage medium containing computer instructions that cause a computer system to:

determine a first position of a list element in a list that would be found using a prefix search, the list having a plurality of list elements, each list element having a position in the list;

determine a second position of a list element in the list that would be found using a first character search; and select the list element whose determined position is closer to the position of a predetermined list element.

30. The computer-storage medium of claim 29 wherein the computer instructions that determine a first position of a list element using the prefix search compare a search character sequence with the prefix of each list element starting with the predetermined list element.

31. The computer-storage medium of claim 29 wherein the computer instructions that determine a second position of the list element using the first character search compare a search character with the first character of each list element starting with the list element after the predetermined list element.

* * * * *